United States Patent [19]
Belthle

[11] Patent Number: 4,930,265
[45] Date of Patent: Jun. 5, 1990

[54] THREAD GRINDING METHOD AND MACHINE

[75] Inventor: Heinz Belthle, Aichwald, Fed. Rep. of Germany

[73] Assignee: Schaudt Maschinenbau GmbH, Stuttgart, Fed. Rep. of Germany

[21] Appl. No.: 767,344

[22] Filed: Aug. 20, 1985

[30] Foreign Application Priority Data

Aug. 28, 1984 [DE] Fed. Rep. of Germany ....... 3431506

[51] Int. Cl.⁵ .............................................. B23G 1/36
[52] U.S. Cl. ....................................... 51/288; 51/325; 51/5 D; 51/95 TG; 51/206 P
[58] Field of Search ................. 51/5 D, 95 R, 95 LH, 51/95 WH, 95 TG, 206 R, 206 P, 165.74, 165.76, 165.91, 288, 325

[56] References Cited

U.S. PATENT DOCUMENTS

| | | | |
|---|---|---|---|
| 2,224,817 | 12/1940 | Hawgood | 51/95 TG |
| 2,394,475 | 2/1946 | Pierre | 51/165.76 |
| 2,624,159 | 1/1953 | Balsiger | 51/288 X |
| 2,929,172 | 3/1960 | Pasell | 51/95 TG |
| 3,299,579 | 1/1967 | Jacobson | 51/206 R |
| 3,885,353 | 5/1975 | Ota et al. | 51/5 D |
| 4,036,607 | 7/1977 | Freddi | 51/165.91 X |

FOREIGN PATENT DOCUMENTS

| | | | |
|---|---|---|---|
| 676815 | 12/1963 | Canada | 51/165.74 |
| 2147100 | 6/1972 | Fed. Rep. of Germany | 51/288 |

*Primary Examiner*—Robert P. Olszewski
*Attorney, Agent, or Firm*—Peter K. Kontler

[57] ABSTRACT

The cylindrical peripheral surface of a rotating workpiece is ground by a first section of a rotating grinding wheel while a second section of the grinding wheel is used to simultaneously grind a thread into the peripheral surface so that the reduction of the diameter of the peripheral surface and the forming of a thread therein take place in one and the same operation. The two sections can constitute integral parts of a one-piece grinding wheel or two discrete spaced-apart components of a composite grinding wheel. The diameters of the freshly ground portions of the peripheral surface are monitored by a measuring head which transmits appropriate signals to a computer for regulation of the controls of the grinding machine so as to change the position of the grinding wheel relative to the rotating workpiece if the diameter of the ground portion of the peripheral surface deviates from a preselected value. The same measuring head can be used to ascertain radial deviations of the rotating workpiece. The profile of the second section of the grinding wheel remains unchanged in the course of the grinding operation. This is achieved by using a highly wear-resistant second section and/or by continuously dressing the second section during removal of material from the workpiece.

21 Claims, 3 Drawing Sheets

THREAD GRINDING METHOD AND MACHINE

BACKGROUND OF THE INVENTION

The present invention relates to the making of threads in cylindrical portions of workpieces, and more particularly to improvements in a method of and in a machine for grinding threads in cylindrical portions of workpieces.

It is already known to grind threads into the peripheral surface of a workpiece which is held between a headstock and a tailstock and is movable therewith axially with reference to a grinding tool. It is further known to provide a grinding machine wherein the workpiece is mounted in the just described manner with a grinding wheel holder which is angularly movable in the machine. A drawback of conventional thread grinding machines is that the grinding of workpieces invariably involves several operations one of which includes grinding the workpiece for the purpose of ensuring that the diameter of the ultimate product will match the desired value and the other of which includes forming the thread in the peripheral surface of the workpiece. Thus, each workpiece is caused to move along the grinding tool or tools for a first time in order to complete one of the just enumerated operations, and a second pass is required to perform the other operation. This is a time-consuming procedure. Moreover, the versatility of heretofore known thread grinding machines is rather low, i.e., though a conventional machine is capable of grinding threads on several types of workpieces, the shape of threads and/or the dimensions of workpieces which can be treated in conventional machines is limited. Still further, repeated transport of one and the same workpiece past a grinding tool invariably brings about at least some deviations from the desired optimum dimensions and configuration of the ultimate products.

OBJECTS AND SUMMARY OF THE INVENTION

An object of the invention is to provide a novel and improved method which renders it possible to grind threads into the peripheral surface of the cylindrical portion of a workpiece in a time-saving operation and with a high degree of accuracy and reproducibility.

Another object of the invention is to provide a method which can be practiced in connection with the grinding of all or nearly all types of threads and for the treatment of long, short, small-diameter or large-diameter workpieces.

A further object of the invention is to provide a method which renders it possible to complete the treatment of each of a series of workpieces in a single operation in such a way that the diameter and the dimensions of the threads on each of a short or long series of workpieces match exactly the prescribed parameters.

An additional object of the invention is to provide a novel and improved grinding machine which can be utilized for the practice of the above outlined method.

Still another object of the invention is to provide a highly versatile thread grinding machine which can be utilized for the grinding of vee threads and also of any other types of threads with the same degree of facility and accuracy.

A further object of the invention is to provide a grinding machine which can treat preformed workpieces or workpieces which are devoid of any threads prior to grinding.

Another object of the invention is to provide novel and improved grinding tools which can be utilized in the above outlined grinding machine.

An additional object of the invention is to provide a grinding machine wherein the time which is required to change the setup is but a small fraction of the time which is required to convert a conventional thread grinding machine for the making or finishing of different types of threads and/or for the treatment of different types of workpieces.

One feature of the invention resides in the provision of a method of grinding threads into the cylindrical peripheral surface of a workpiece. The method comprises the steps of rotating the workpiece about the axis of its peripheral surface, subjecting the peripheral surface of the rotating workpiece to a first grinding action in order to reduce the diameter of the peripheral surface to a preselected value, and simultaneously subjecting the rotating workpiece to a second grinding action serving to provide the peripheral surface with at least one thread. The step of subjecting the workpiece to the second grinding action preferably includes contacting the workpiece with a driven grinding tool or with a predetermined section of a driven grinding tool, and such method preferably further comprises the step of keeping the profile of the grinding tool or of its section from changing in the course of the second grinding action.

The method preferably further comprises the steps of monitoring the diameter of the freshly ground portions of the peripheral surface in the course of the first grinding action and modifying the first grinding action when the monitored diameter deviates from the preselected value.

Still further, the method preferably comprises the steps of monitoring the workpiece for the presence of radial deviations in the course of the grinding actions and interrupting the rotating step and/or disengaging the workpiece from the grinding instrumentalities when the monitored radial deviation of the workpiece exceeds a predetermined threshold value. The means for monitoring the diameters of freshly ground portions of the peripheral surface of the workpiece is preferably also used to monitor the extent (if any) of radial deviation of the workpiece while the workpiece is rotated and is acted upon for the purpose of reducing the diameter of its peripheral surface and providing the peripheral surface with one or more threads.

The steps of subjecting the workpiece to the first and second grinding actions can include contacting the workpiece with two differently profiled sections of one and the same rotary grinding tool. Alternatively, such steps can include contacting the workpiece with two differently profiled grinding tools which are rotated about a common axis.

Another feature of the invention resides in the provision of a machine for grinding threads into the cylindrical peripheral surfaces of normally metallic workpieces. The machine comprises a work holder which includes means (e.g., a chuck) for rotating a workpiece about the axis of its cylindrical peripheral surface, a tool holder, means for moving one of the holders relative to the other holder in the axial direction of the workpiece in the work holder, and a grinding tool which is provided on the tool holder and includes a first section serving to remove material from the peripheral surface of the workpiece in the work holder so as to reduce the diameter of the peripheral surface to a preselected value, and a second section which serves to provide the workpiece in the work holder with at least one thread (e.g., with a vee thread) while the peripheral surface of the same workpiece is acted upon by the first section. For example, the work holder can comprise a headstock for one end portion of the workpiece and a tailstock for the other end portion of such workpiece, and the moving means can comprise a reciprocable carriage which is common to the headstock and the tailstock. If desired or necessary, the moving means can further comprise means (e.g., a turntable or the like) for changing the orientation of the axis of the grinding tool and/or means for moving the grinding tool in directions at right angles to the path of reciprocatory movement of the carriage for the headstock and the tailstock.

It is preferred to keep the profile of the second section of the grinding tool from changing while the second section acts upon (i.e., while it is in material-removing engagement with) a workpiece in the work holder. This can be achieved by making the second section of or by incorporating in the second section a highly wear-resistant material such as cubic boron nitride. Alternatively, or in addition to the just mentioned feature, the grinding machine can be provided with means for dressing the working surface of the second section of the grinding tool while such second section is acting upon the workpiece which is held by the work holder. The dressing means can comprise at least one rotary, otherwise movable or fixedly mounted dressing tool and means (e.g., a motor-driven reciprocable carriage or slide) for urging the dressing tool into uninterrupted engagement with the working surface of the second section of the grinding tool while such second section is acting upon a workpiece which is held by the work holder.

The first section of the grinding tool can be located ahead of or behind the second section, as considered in the direction of axial movement of the workpiece during removal of material by the two sections. The first section of the grinding tool can comprise a preferably conical or frustoconical first part for roughening the peripheral surface of the workpiece in the work holder and a preferably cylindrical second part for secondary (precision) treatment of the freshly roughened portion of the peripheral surface of the workpiece. The two sections can constitute two integral components of a one-piece grinding wheel or they can be at least slightly spaced apart from each other. In either event, the sections are preferably rotated as a unit about their common axis.

The machine preferably further comprises means for monitoring the diameters of freshly ground portions of the peripheral surface of the workpiece in the work holder while the workpiece is being acted upon by the first and second sections of the grinding tool. The monitoring means can comprise means for monitoring the workpiece which is held by the work holder for the presence or absence of radial deviations while the two sections of the grinding tool are in the process of acting upon the workpiece. In accordance with a presently preferred embodiment of the improved grinding machine, the monitoring means comprises a plurality of discrete sensors and means for moving at least one of these sensors with reference to at least one other sensor. The other sensor can be located at a level below a normally horizontally mounted workpiece when the monitoring means is in actual use, and the one sensor is preferably pivotable and/or otherwise movable with reference to the other sensor. The one sensor can be mounted for movement into and from contact with the thread which is formed in the peripheral surface of the workpiece in the work holder.

The novel features which are considered as characteristic of the invention are set forth in particular in the appended claims. The improved grinding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
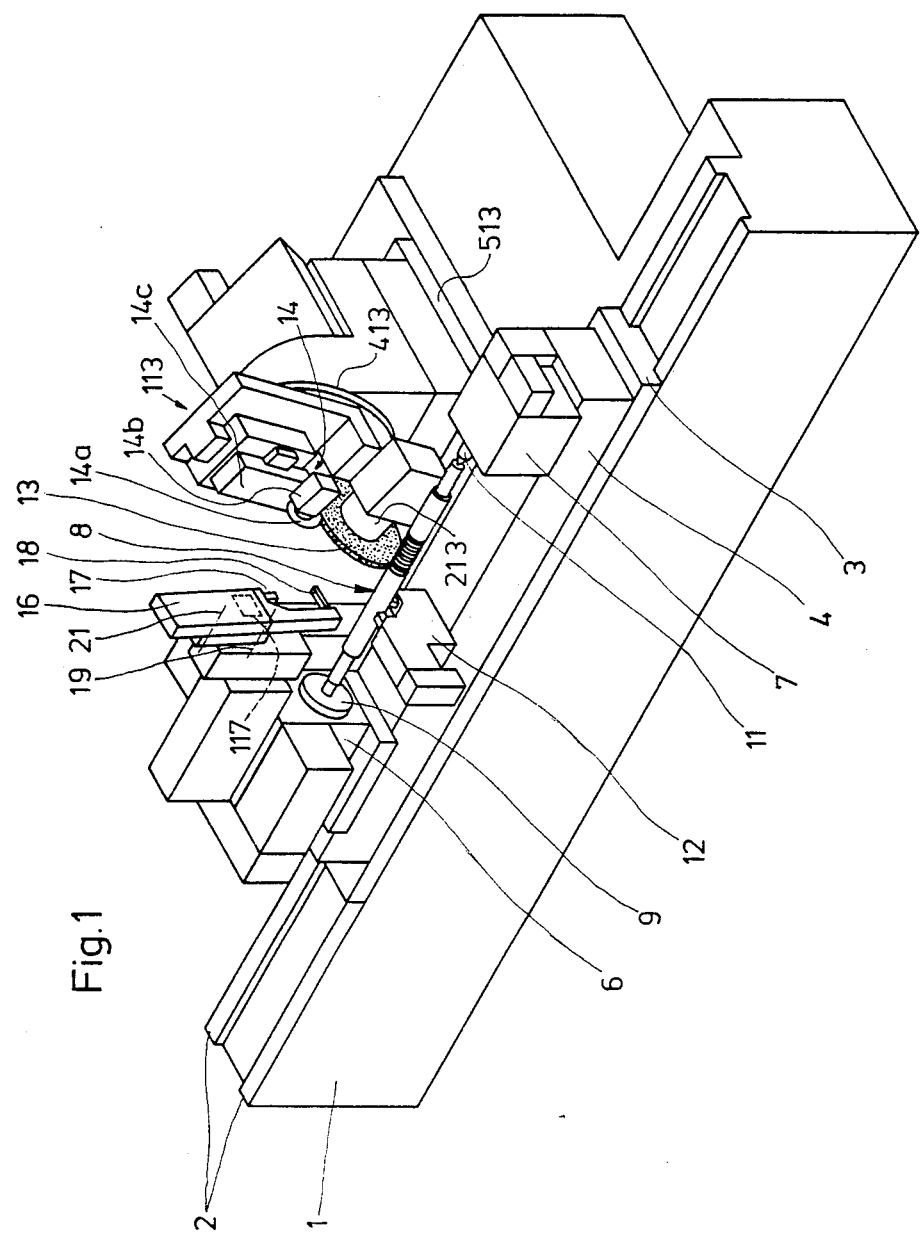
FIG. 1 is a perspective view of a grinding machine which embodies one form of the present invention.

FIG. 1 shows a grinding machine which embodies one form of the present invention. The machine comprises a base or bed 1 for elongated ways 2 serving as a guide means for a reciprocable carriage 3 which, in turn, supports a table 4 for a fixedly mounted headstock 6 and a reciprocably mounted tailstock 7. The headstock 6 has a driven rotary chuck 9 which engages one end portion of an elongaged at least partly cylindrical workpiece 8. The other end portion of the workpiece 8 has an axially disposed bore for the tip of a center 11 on the tailstock 7. The latter is adjustable relative to the table 4 so that the parts 6 and 9 can properly engage short or long workpieces. If the workpiece is long or very long, the table 4 preferably further supports one or more steady rests 12 for one or more intermediate portions of the workpiece.

The grinding tool 13 is mounted in a tool holder 113 so that its inclination (the orientation of the axis) can be altered within a wide range. The means 413 (e.g., a turntable) for adjusting the angular position of the tool 13 and the means 513 (e.g., a slide) for moving the tool holder 113 at right angles to the ways 2 are indicated but not shown in full detail because their exact construction forms no part of the present invention. All that counts is to ensure that the mounting of the grinding tool 13 allows for necessary adjustments which must be carried out in order to treat larger-diameter or smaller-diameter workpieces as well as to cut threads having different pitches, leads, shapes and/or other characteristics as well as to cut single or multiple threads.

The grinding machine further comprises a dressing apparatus 14 whose rotary tool 14a is used for continuous or intermittent dressing of the grinding tool 13, depending on the nature of the material of the grinding tool. The illustrated dressing apparatus comprises the rotary dressing tool 14a, means 14b for rotating the tool 14a, and means 14c for moving the tool 14a with reference to the grinding tool 13.

Still further, the grinding machine of FIG. 1 comprises a monitoring or measuring instrument 16 which is movable toward and away from engagement with the workpiece 8 between the headstock 6 and the tailstock 7. In FIG. 1, the measuring head 16 has been moved away from the workpiece 8 so as to show the actual material removing station. The illustrated measuring head 16 comprises two sensors 17 and 18 and is turnable about two discrete axes 19 and 21 (indicated by phantom lines) by means of a suitable linkage (e.g., a parallel motion), not shown. The means for pivoting the sensor 17 relative to the sensor 18 is indicated at 117.

In heretofore known thread grinding machines, grinding of one or more threads is invariably preceded by a grinding operation which involves a reduction of the diameter of the workpiece to a preselected value. Such grinding operation is carried out along the full length of that portion of the workpiece which is to be provided with a thread.

Figure 2:
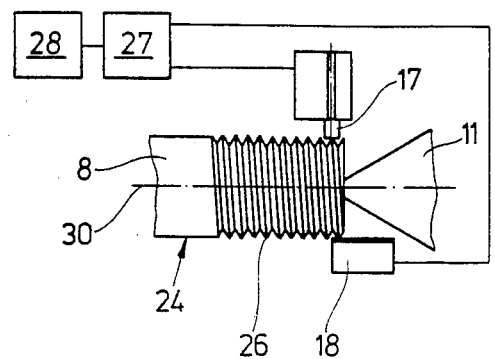
FIG. 2 illustrates a portion of a workpiece having a vee thread and further shows the sensors of the monitoring means in the course of ascertaining the diameter of the peripheral surface of the workpiece.

In accordance with the method of the present invention, the making of a thread 26 in the peripheral surface 24 (FIG. 2) of the workpiece 8 between the headstock 6 and the tailstock 7 takes place simultaneously with that treatment which involves the grinding of the peripheral surface of the workpiece so as to ensure that the diameter of the finished product will match a preselected value. The outer diameter of the freshly ground portion of the peripheral surface 24 of the workpiece 8 is monitored in the course of the grinding operation, and the grinding of the peripheral surface is adjusted, if necessary, so as to ensure that the outer diameter of the finished product will invariably match the optimum value. In addition, the profile of the grinding wheel 13 remains unchanged or is changed in such a way that the profile of the freshly formed thread 26 matches the desired profile. In other words, the improved machine ensures continuous measurement of the diameter of the workpiece 8 in the region where the diameter has been reduced or where the diameter is about to be reduced, both for the purpose of ensuring that the diameter of the finished product will match the desired value, and the improved machine further ensures that the profile of each and every portion of the thread 26 which is ground into the peripheral surface 24 of the workpiece 8 matches the selected profile.

Figure 3:
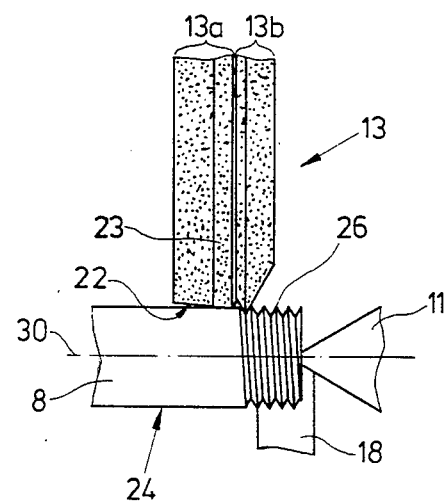
FIG. 3 shows the workpiece of FIG. 2 in engagement with the two sections of a one-piece rotary grinding tool.
Figure 4:
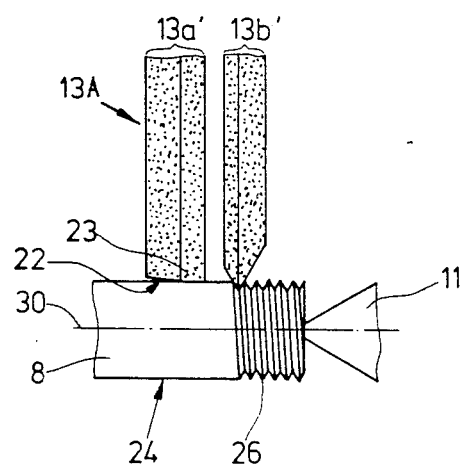
FIG. 4 is a view similar to that of FIG. 3 but showing the spaced-apart coaxial sections of a two-piece grinding tool.

The above features are achieved in that the grinding tool 13 or 13A of the machine which is shown in FIG. 1 comprises two wheel-shaped rotary sections or constituents 13a and 13b or 13a' and 13b' (see FIGS. 3 and 4). In the embodiment of FIG. 3, the sections 13a and 13b constitute integral parts of a one-piece grinding wheel 13. The section 13a serves for the treatment of the peripheral surface 24 of the workpiece 8 so as to ensure that the diameter of the peripheral surface 24 will match the desired or selected diameter. To this end, the section 13a comprises a relatively narrow cylindrical part 23 which is immediately adjacent to the section 13b and a wider substantially conical part 22 which serves for rough or preliminary treatment of the surface 24. The workpiece 8 is advanced in a direction to the left, as viewed in FIG. 3, so that the treatment by the part 22 precedes the treatment by the part 23 and the treatment by the part 23 precedes the making of threads 26 by the section 13b. The axis 30 of the cylindrical portion of the workpiece 8 coincides with the axis of the center 11 which forms part of the tailstock 7. The headstock 6 and its chuck 9 are not shown in FIG. 3.

The composite grinding tool 13A of FIG. 4 comprises two discrete coaxial sections or tools 13a' and 13b' which are mounted on a common drive shaft or spindle 213 (see FIG. 1) and are slightly spaced apart from one another, as considered in the axial direction of the workpiece 8. The section 13a' again comprises a conical roughing part 22 and a cylindrical part 23 which latter serves for precision treatment of the roughened peripheral surface of the rotating workpiece 8. The section 13b' of the grinding tool 13A which is shown in FIG. 4 is identical with the section 13b of the tool 13 shown in FIG. 3.

As can be seen in FIGS. 3 and 4, the tool 13 or 13A is capable of finishing the peripheral surface 24 of the workpiece 8 simultaneously with grinding of the thread 26 so that a single pass through the machine of FIG. 1 suffices to complete the grinding of the workpiece with attendant savings in time and higher output of the machine.

It has been found that the improved machine can ensure a highly satisfactory simultaneous grinding of the peripheral surface 24 and the grinding of a selected thread 26 if the outer diameter of the workpiece 8 is measured in the course of the actual grinding operation. Such measurement is carried out by the measuring head 16 or with an analogous measuring or monitoring instrument. An even more satisfactory grinding of the peripheral surface 24 simultaneously with the making of the thread 26 is rendered possible by ensuring that the profile of the section 13b of the grinding tool 13 or 13A remains unchanged in the course of the entire grinding operation. The illustrated measuring head 16 can be an instrument of the NC-type known as Diatronic 2 which is manufactured and distributed by the assignee of the present application. The lower sensor 18 of the measuring head 16 (as viewed in FIG. 1 or 2 (is designed to come in contact with the peripheral surface 24 of the workpiece 8 between the headstock 6 and the tailstock 7, and is adjustable so that it can highly satisfactorily engage the peripheral surfaces of large-, medium- or small-diameter workpieces. The other sensor 17 serves to generate signals which are used to ensure accurate longitudinal orientation of the treated workpiece. In addition, and if the workpiece is of the type shown in FIGS. 5 to 7 (with a ball thread which is formed in a turning machine or the like and is to be finished by grinding in a machine embodying the present invention), the sensor 17 serves to transmit signals which are averaged by a computer 27 (FIG. 2) and are transmitted to the controls 28 (e.g., automatic numerical controls) of the grinding machine. The manner in which the controls 28 generate signals which are utilized to adjust the position of the grinding tool 13 or 13A relative to the workpiece 8 between the center 11 and chuck 9 and/or vice versa is known and need not be described here. All that counts is to ensure that the machine can perform a grinding operation which involves the treatment of the peripheral surface 24 of a selected workpiece 8 simultaneously with a grinding operation which involves the making of threads 26 or the finishing of previously machined threads.

The profile of the section 13b of the grinding tool 13 or 13A can remain unchanged either by utilizing a section 13b which is highly resistant to wear (such section can be made of cubic boron nitride) and/or by continuously dressing (so-called CD-dressing) the section 13b in the course of the actual grinding operation.

The combination of the aforediscussed undertakings ensures the making of products whose diameters closely approach or match the selected optimum diameter and whose threads exhibit a profile which very closely approximates or matches the desired optimum profile.

The making of a normal vee thread 26 (shown in FIGS. 2, 3 and 4) preferably involves removal of requisite quantities of material from the workpiece 8 in a single pass relative to the sections 13a and 13b of the grinding wheel, i.e., the means 513 moves the tool holder 113 in a direction toward the ways 2 for the carriage 3 to such an extent that the working surface of the section 13b or 13b' penetrates well into the peripheral surface 24 of the rotating workpiece 8 so that the latter is formed with a thread 26 of requisite depth. Such deep grinding operation contributes to a much higher output of the grinding machine and reduces the likelihood of deviation of the profile of the finished workpiece from an optimum profile. In other words, the working surface of the section 13b or 13b' penetrates into the freshly-ground peripheral surface 24 to form therein one or more threads as a result of rotation of the workpiece 8 and the tool 13 or 13A about their respective axes while the carriage 3 moves the workpiece axially and the tool holder 113 is held at a required distance from the axis 30.

Figure 5:
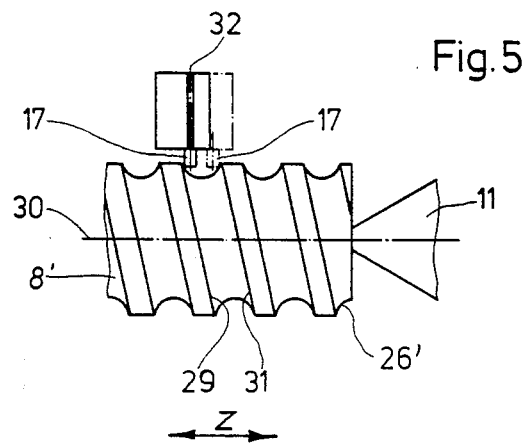
FIG. 5 shows a portion of a workpiece which has a prefabricated ball screw thread and one of the sensors which are used to monitor the positions of flanks on the precut thread of the workpiece.
Figure 6:
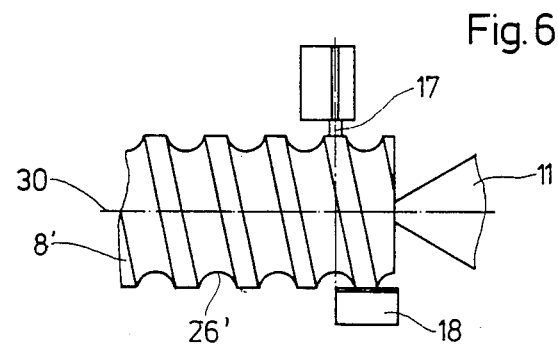
FIG. 6 illustrates the workpiece of FIG. 5 and the sensors of the monitoring means in the process of ascertaining radial deviations of the rotating workpiece.
Figure 7:
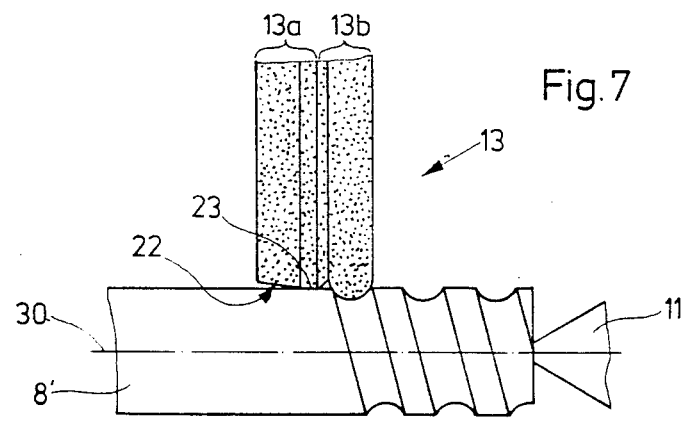
FIG. 7 shows the workpiece of FIGS. 5 and 6 and the sections of a one-piece grinding tool which is used to grind the peripheral surface of the workpiece and to simultaneously finish the thread in such peripheral surface.

The situation is somewhat different if the improved grinding machine is used for the treatment of workpieces 8' of the type shown in FIGS. 5, 6 and 7. The illustrated workpiece 8' is a so-called ball screw which has a profile wherein a spiral cylindrical portion alternates with a spiral concave portion. The threads of workpieces of the type shown in FIGS. 5 to 7 are often subjected to high or extremely high stresses. In many instances, the thread of a workpiece 8' is preformed in a lathe or in another turning machine so that its profile resembles the profile of the ultimate product prior to start of simultaneous treatment by the sections 13a, 13b or 13a', 13b' of the grinding tool 13 or 13A. The profile of the workpiece 8' which is to be treated in the improved grinding machine is normally hardened subsequent to turning and prior to grinding. In order to properly locate the workpiece 8' and the tool 13 or 13A relative to each other prior to engaging the sections 13a, 13b or 13a', 13b' with the peripheral surface and the preformed thread of the workpiece 8', it is necessary to monitor the positions of the flanks 29, 31 of the preformed thread 26' on the workpiece 8' and to average the thus obtained signals so as to ensure adequate removal of material from the entire spiral portion of the external surface of such workpiece while the latter is held between the headstock 6 and the tailstock 7 of the work holder and is moved axially relative to the rotating grinding tool 13 or 13A. Such averaging operation is desirable and normally necessary because the step of hardening the preformed workpiece 8' often involves at least some distortion of the workpiece so that the dimensions of its preformed thread 26' deviate from the anticipated dimensions. For example, the lead or pitch of the thread 26' is likely to change in the course of the hardening operation.

The manner in which the sensor 17 of the measuring head 16 can be used to monitor the extent of distortion of the preformed thread 26' is shown in FIG. 5. The workpiece 8' is rotated about its axis 30 by the chuck 9 which is not shown in FIGS. 5 to 7. The arrangement is such that the workpiece 8' is rotated first in a clockwise direction and thereupon in a counterclockwise direction, or vice versa, relative to the sensor 17 so that the latter is brought into contact with the flanks 29 and 31 of preformed thread 26'. The sensor 17 is turnable with reference to the sensor 18 (not shown in FIG. 5) about an axis 32 which is normal or substantially normal to the axis 30 of the workpiece 8'. Signals denoting those positions in which the sensor 17 is contacted by the flanks 29 and 31 are transmitted to the computer 27 of FIG. 2 and the computer processes such signals and transmits an "average" signal which is used by the controls 28 to select an optimum axial position of the workpiece 8' relative to the grinding tool 13 or 13A before the sections 13a, 13b or 13a', 13b' are permitted or caused to come into material-removing contact with the cylindrical peripheral surface and with the concave peripheral surface of the workpiece 8'. From thereon, the grinding of the peripheral surface of the workpiece 8' simultaneously with grinding of the concave surface takes place in the same way as described in connection with the workpiece 8 (see FIG. 7).

In addition to or in lieu of rotating or pivoting the sensor 17 about the axis 32 while the workpiece 8' is caused to rotate about the axis 30, it is also possible to move the workpiece 8' axially (i.e., in the direction of the Z-axis which is indicated in FIG. 5 by a double-headed arrow). The difference is that, if the workpiece 8' is caused to rotate about the axis 30 (while the measuring head 16 including the sensors 17 and 18 ascertains the extent of deviation of the flanks 20, 31 from optimum positions), the sensor 17 detects the positions of two angularly offset portions of the flanks 29, 31 relative to each other whereas, if the workpiece 8' is held against rotation about the axis 30 but is moved in the direction of such axis, the sensor 17 ascertains the positions of such portions of the flanks 29 and 31 which are located directly opposite each other.

An additional problem which arises especially if the grinding machine is to treat workpieces 8' of the type shown in FIGS. 5 to 7 is that the workpiece is likely to exhibit at least some radial deviation. Such radial deviation is likely to arise as a result of uncontrollable stresses which develop in the course of the hardening operation, i.e., subsequent to turning but prior to grinding. While a treatment of workpieces 8' for the purpose of eliminating stresses that cause radial deviations results in a reduction of such deviations, some radial deviation remains and it is likely to adversely influence the shape of the ultimate product. Detection of any remaining radial deviation in the course of the dual grinding operation is highly desirable and advantageous, and such detection is simplified by the fact that it can be achieved with the measuring head 16, i.e., there is no need to provide discrete second monitoring means for the purpose of detecting and indicating the presence of radial deviations. All that is necessary is to maintain the upper sensor 17 in a preselected position (note FIG. 6) which corresponds to no radial deviation and to monitor the extent to which the sensor 17 is caused to move radially of the axis 30 when the workpiece 8' is treated by the sections 13a, 13b of the tool 13 shown in FIG. 7 or by the sections 13a', 13b' of the tool 13A if the latter is used in lieu of the tool 13. Signals which are generated by the measuring head 16 as a result of those radial movements of the sensor 17 which are attributable to radial deviation of the rotating workpiece 8' are processed by the computer 27 which transmits appropriate signals to the controls 28 which, in turn, change the axial position of the workpiece 8' to compensate for radial deviation. If the radial deviation exceeds a preselected threshold value, the signal from the computer 27 to the controls 28 of the grinding machine results in an interruption of rotation of the workpiece 8' and/or in a movement of the tool holder 113 away from the path of axial movement of the workpiece 8' so that the grinding operation is interrupted. The workpiece 8' is then removed from the space between the headstock 6 and the tailstock 7 and is subjected to a straightening operation prior to reintroduction into the grinding machine.

An important advantage of the improved method and machine is that the machine can treat a surprisingly wide variety of workpieces by the simple expedient of maintaining a requisite supply of properly profiled grinding tools 13 or 13A. The workpieces can be provided with left-hand or right-hand threads, with threads of any desired shape including vee threads, ball screw threads and others, as well as with single or multiple threads. The pitch or lead of the thread can be selected practically at will, and a change of setup to treat different types of workpieces or to subject one and the same type of workpieces to a different treatment requires a minimal amount of time.

Another important advantage of the improved method and machine is that the treatment of discrete workpieces can be completed within a small fraction of the time which is required in a conventional machine wherein each workpiece must be caused to move several times past the grinding wheel and/or vice versa because the removal of material from the peripheral surface for the purpose of ensuring that the diameter of the peripheral surface will match a preselected value precedes or follows the removal of material for the purpose of providing the workpiece with a ground thread.

A further important advantage of the improved method and machine is that a single monitoring means can be used to carry out all necessary monitoring operations including ascertaining the diameters of freshly ground portions of the peripheral surface of a workpiece, selecting the optimum position of a workpiece which is provided with a preformed thread, and ascertaining radial deviations of the rotating workpiece. This reduces the initial and maintenance cost of the machine and reduces the time which is necessary for a change of setup. Moreover, one and the same monitoring means is sufficiently flexible to render it useful in connection with the treatment of smaller- or larger-diameter workpieces as well as in connection with the treatment of workpieces with or without precut threads.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of grinding threads into the cylindrical peripheral surface of a workpiece, comprising the steps of rotating the workpiece about its axis; subjecting the peripheral surface of the rotating workpiece to a first grinding action so as to reduce the diameter of the peripheral surface to a preselected value; simultaneously subjecting the rotating workpiece to a second grinding action to provide the peripheral surface with at least one thread, including contacting the workpiece with a driven grinding tool having a predetermined profile; keeping such profile from changing in the course of said second grinding action; monitoring the diameter of freshly ground portions of the peripheral surface in the course of said first grinding action; and modifying said first grinding action when the monitored diameter deviates from said preselected value.

2. The method of claim 1, further comprising the step of monitoring the workpiece for the presence of radial deviations in the course of said grinding actions.

3. The method of claim 2, further comprising the step of interrupting said rotating step when the monitored radial deviation of the workpiece exceeds a predetermined threshold value.

4. The method of claim 2, further comprising the step of modifying said first grinding action when the monitored diameter deviates from said preselected value.

5. The method of claim 1, wherein said steps of subjecting the workpiece to said first and second grinding actions include contacting the workpiece with two differently profiled sections of one and the same rotary grinding tool.

6. The method of claim 1, wherein said steps of subjecting the workpiece to said first and second grinding actions include contacting the workpiece with two differently profiled grinding tools.

7. The method of claim 6, further comprising the step of rotating the grinding tools about a common axis.

8. A machine for grinding threads into the cylindrical peripheral surfaces of workpieces, comprising a work holder having means for rotating a workpiece about its axis; a tool holder; means for moving one of said holders relative to the other of said holders in the axial direction of the workpiece which is held by said work holder; a grinding tool provided on said tool holder and including a first section arranged to remove material from the peripheral surface of the workpiece in said work holder so as to reduce the diameter of the peripheral surface to a preselected value, and a second section having a predetermined profile and arranged to provide the workpiece in said work holder with at least one thread while the peripheral surface of such workpiece is acted upon by said first section; means for keeping said profile from changing while said second section acts upon a workpiece in said work holder; and means for monitoring the diameters of freshly ground portions of the peripheral surface of the workpiece in said work holder while the workpiece is being acted upon by said first and second sections.

9. The machine of claim 8, wherein said work holder comprises a headstock for one end portion and a tailstock for the other end portion of the workpiece which is held by said work holder and said moving means includes a reciprocable carriage common to said headstock and said tailstock, said moving means further comprising means for changing the orientation of the axis of said grinding tool.

10. The machine of claim 8, wherein said monitoring means comprises means for monitoring the workpiece which is held by said work holder for the presence of radial deviations while said sections of the grinding tool are in the process of acting upon the workpiece.

11. The machine of claim 8, wherein said moving means includes means for moving the work holder in a predetermined direction axially of the workpiece which is being held thereby, said first and second sections being adjacent to each other and one of said sections being disposed behind the other of said sections as considered in said direction.

12. The machine of claim 8, wherein said first section includes a first part for roughening the peripheral surface and a second part for secondary treatment of the roughened portion of the peripheral surface of the workpiece which is held by said work holder.

13. The machine of claim 12, wherein said first part has a conical outline and said second part has a cylindrical outline.

14. The machine of claim 8, wherein said sections are spaced apart from and coaxial with one another, and further comprising means for rotating said sections about their common axis.

15. The machine of claim 8, said monitoring means comprising a plurality of discrete sensors and means for moving at least one of said sensors relative to at least one other sensor.

16. The machine of claim 15, wherein said other sensor is located at a level below the workpiece in said work holder and said one sensor is pivotable with reference to said other sensor.

17. The machine of claim 15, wherein said one sensor is movable into and from contact with the thread which is formed in the peripheral surface of the workpiece in said work holder.

18. The machine of claim 8, wherein at least the second section of said grinding tool contains a highly wear-resistant material so that the profile of such second section remains unchanged during removal of material from a workpiece which is held by said work holder.

19. The machine of claim 18, wherein said material is cubic boron nitride.

20. The machine of claim 8, wherein said keeping means comprises means for dressing the working surface of said second section while such second section is acting upon a workpiece which is held by said work holder.

21. The machine of claim 20, wherein said dressing means comprises at least one dressing tool and means for urging said dressing tool into uninterrupted engagement with the second section of said grinding tool while such second section is acting upon a workpiece which is held by said work holder.

* * * * *